United States Patent [19]
Jahsman et al.

[11] Patent Number: 5,954,296
[45] Date of Patent: Sep. 21, 1999

[54] AIRCRAFT CANOPY FRACTURE SYSTEM

[75] Inventors: Hendrick E. Jahsman; Kevin Mark Hopwood, both of Hollister, Calif.

[73] Assignee: Teledyne Industries, Inc., Los Angeles, Calif.

[21] Appl. No.: 09/025,479

[22] Filed: Feb. 18, 1998

[51] Int. Cl.[6] .................................................. B64C 1/00
[52] U.S. Cl. ..................... 244/121; 244/122 AF
[58] Field of Search ........................... 244/121, 122 AF; 89/36.11

[56] References Cited

U.S. PATENT DOCUMENTS

| | | | |
|---|---|---|---|
| 3,281,097 | 10/1966 | deTienne | 244/122 AF |
| 3,670,998 | 6/1972 | Charleville et al. | 244/122 AF |
| 3,880,387 | 4/1975 | Martin, Jr. | 244/122 AF |
| 4,301,707 | 11/1981 | Schimmel et al. | 244/122 AF |
| 4,570,879 | 2/1986 | Dupin | 244/122 AF |
| 5,104,067 | 4/1992 | McIntyre et al. | 244/122 AF |

FOREIGN PATENT DOCUMENTS

| | | |
|---|---|---|
| 123-481 | 10/1984 | European Pat. Off. . |
| 2492-336 | 4/1982 | France . |
| 9404441 | 12/1994 | Sweden . |
| WO96/19381 | 6/1996 | WIPO . |

OTHER PUBLICATIONS

Brochure entitled "JAS 39 Gripen Canopy Fracturing System", issued by Saab Military Aircraft.

R. Ingham, "A Systems Engineering Design Guide to Aircraft Explosive Canopy Fracturing" (Dec. 1993), Teledyne Ryan Aeronautical, McCormick Selph Ordanance.

"Emergency Egress Canopy Fracturing", Teledyne McCormick Selph.

"Qualification Test Report for Detonating Cord Assembly AV–8B Canopy Fracturing Program", Teledyne McCormick Selph, Hollister, CA, issue date Jan. 25, 1982.

*Primary Examiner*—J. Woodrow Eldred
*Attorney, Agent, or Firm*—Robert J. Pugh; Patrick J. Viccaro

[57] ABSTRACT

An aircraft canopy fracturing system includes a canopy having fore and aft portions and a region that is severable from the canopy to provide an opening therethrough for the egress of aircraft occupants. The severable region has a shape that inhibits passage of the severable region through the opening created in the canopy once the severable region is freed from the canopy and is displaced aftward relative to the canopy. The canopy fracturing system also may include one or more mechanisms that will impart an aftward impulse to the severable region of the canopy once it has been severed and freed from the remainder of the canopy.

45 Claims, 12 Drawing Sheets

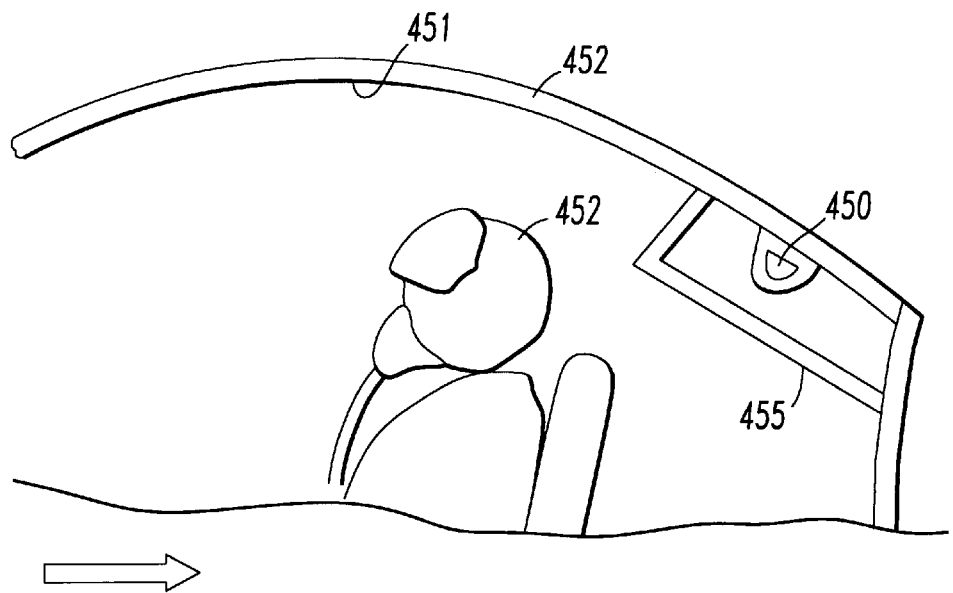
FIG. 13
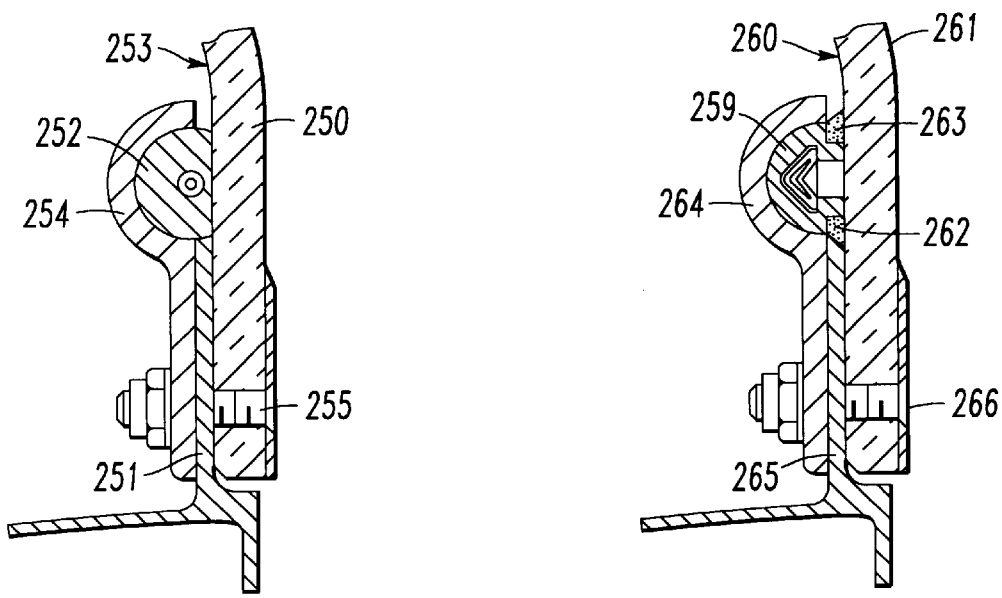
FIG. 14
FIG. 15

AIRCRAFT CANOPY FRACTURE SYSTEM

CROSS-REFERENCE TO RELATED APPLICATIONS

Not Applicable

STATEMENT REGARDING FEDERALLY SPONSORED RESEARCH OR DEVELOPMENT

Not Applicable

TECHNICAL FIELD AND INDUSTRIAL APPLICABILITY OF THE INVENTION

This invention relates generally to a system for fracturing the canopy of an aircraft to allow the egress of the pilot or other occupant. More particularly, the invention relates to an aircraft canopy fracturing system for wherein the severed canopy portion has a reduced tendency to implode into the aircraft cabin in negative pressure environments. The aircraft canopy fracturing system of the present invention may be applied to any aircraft having a canopy and wherein safe severance and flyaway of a portion of the canopy is desired to reduce the attendant risks of emergency egress to the pilot or other occupant.

BACKGROUND OF THE INVENTION

When an ejection seat is jettisoned from the cockpit of an aircraft, it must pass through the region occupied by the transparent canopy of the aircraft. In instances where the canopy is not jettisoned prior to the ejection seat, the ejection seat must be capable of blasting entirely through the canopy. To reduce the risks to the pilot or other aircraft occupant attendant to forcing the ejection seat through the canopy, canopy fracture systems have been provided to fracture the canopy and better clear a path for the ejecting occupant so as to minimize bodily impact with the canopy. The risks attendant to ejection from a moving aircraft are particularly pronounced when the pressure on the exterior of the aircraft canopy exceeds the pressure within the cockpit so that the canopy experiences a negative pressure environment. In such circumstances, the possibility exists that any severed portion of the canopy may implode through the opening created in the canopy and enter into the cockpit.

Canopy fracturing systems may utilize fragilizing or non-fragilizing canopies. For purposes of the present disclosure, "fragilizing" aircraft canopies are those that may be caused to shatter into a significant number of pieces on application of sufficient pressure or explosive force. Such canopies typically are constructed of cast materials including, for example cast acrylic. "Non-fragilizing" aircraft canopies are constructed of materials that do not shatter on application of explosive force but, rather, may be caused to fracture along a predetermined pattern, referred to herein as a "fracture pattern", such that at least a portion of the canopy may be severed and freed from the aircraft and at least a portion of the ejecting occupant may pass relatively unimpeded through the opening fractured in the canopy. Examples of non-fragilizing canopy materials are stretched acrylic and polycarbonate. The fracturing of a non-fragilizing canopy, such as, for example, a stretched acrylic canopy, using the canopy fracturing system of the present invention will not result in the shattering of the canopy or a portion thereof into a significant number of fragments. However, small shards of the non-fragilizing canopy material localized to the source of fracturing energy may be liberated during fracturing.

Several canopy fracturing systems utilizing various fracture patterns are known for facilitating the emergency egress of aircraft pilots and other cockpit occupants. A canopy fracturing system available from Saab Scania and generally described in Swedish patent application number 502678 is utilized in JAS 39B aircraft. The Saab Scania canopy fracturing system utilizes an air bag in the aft canopy of two-seat, dual canopy JAS 39B aircraft to protect the pilot from imploding sections of the canopy following the fracturing of the canopy by a linear shape charge along an S-shaped path during the egress event. Certain features of the Saab Scania canopy fracturing system are depicted in FIG. 1, in which aft canopy 100 includes a canopy frame 110, transparent portion 112, and a linear explosive charge 114 mounted to the transparent portion of the canopy in an S-shaped pattern. The explosive charge 114, when detonated, fractures the transparent portion of the canopy along the S-shaped pattern into "clamshell" sections. Absent inclusion of the airbag in the Saab Scania system, the possibility exists that the severed clamshell sections, although initially forced away from the cockpit by the charge's explosive impulse, may be caused to implode by the aerodynamic field surrounding the canopy. The air bag acts to both drive the severed sections away from the pilot and to physically shield the pilot from those sections as they disintegrate, and it also facilitates aftward passage of the severed sections by action of the airstream passing over the canopy.

Another known canopy fracturing system utilizes a D-shaped fracture pattern. Certain features of that known design is depicted in FIG. 2, in which the canopy is generally designated as 120 and includes transparent portion 124 having explosive charges mounted in D-shaped fracture pattern 126. The D-shaped fracture pattern design successfully clears a path for an ejecting occupant when the aerodynamic field surrounding the canopy is neutral or positive, such that the field assists in the flyaway of the severed D-shaped canopy section, but the system is not as effective in ensuring suitable flyaway of the severed section in negative pressure conditions.

SUMMARY OF THE INVENTION

The present invention provides an improved aircraft canopy fracturing system for creating an opening in the canopy of an aircraft to allow the pilot or other occupant egress from the aircraft in an emergency or otherwise. The present invention's canopy fracturing system utilizes a novel canopy fracture pattern that results in a severed canopy section that will be inhibited from imploding into or otherwise entering the aircraft cockpit. Implosion of severed canopy sections is a risk attendant to ejection in negative pressure environments. The present canopy fracturing system also may be designed to provide an initial aftward impulse to the severed canopy portion that will further reduce the possibility of implosion of the severed canopy section in negative pressure environments and thereby further reduce the risks attendant to ejection.

The canopy fracturing section of the present invention may be designed to provide for the unimpeded passage through the canopy of all or substantially all of the body of the egressing occupant. By that statement it is meant that the present canopy fracturing system may be designed so that all or substantially all of the body of the egressing aircraft occupant and that occupant's ejection seat may pass through the opening fractured through the canopy without contacting the unfractured remainder of the canopy. Such a design significantly reduces the presence of shards or other fragments of canopy material generated by impact during the ejection event and greatly reduces impact loads, and the consequent risk of injury, experienced by the egressing occupant. The dangers posed by fragments of canopy material liberated by impact between the canopy and egressing occupant are particularly significant at high speeds and in negative pressure environments.

As used herein, "aft" or "aftward" refers to a direction or position toward the tail of the aircraft, while "fore" or "forward" refers to a direction or position toward the nose of the aircraft. The canopy fracturing system of the present invention may be variously referred to herein as "the present invention", "the present system", or like language, and such language does not refer to the existing canopy fracturing systems described above.

The present invention's canopy fracturing system includes an aircraft canopy having a severable region. The canopy preferably is constructed predominantly of a durable transparent material of the type commonly used to produce aircraft canopies. The transparent material preferably is a non-fragilizing canopy material, as that term is described above, in order to minimize the number of canopy fragments generated during fracturing. Possible transparent materials include, for example, a stretched acrylic material or a polycarbonate material. The canopy of the present invention may also include a structural frame or other structural members. The severable region of the canopy generally includes fore and aft portions, and the system further includes some means to sever and free the severable region from the remainder of the canopy so as to provide an opening in the canopy for occupant egress. The severable region of the present invention's canopy fracturing system is shaped so that once severed it may not pass through the resultant opening in the canopy after having moved slightly aftward relative to the opening created in the unsevered remainder of the canopy. The present invention may be designed to provide an opening through the canopy through which substantially the entire body of the occupant may pass without contacting the remaining portions of the canopy.

The present invention's means for severing the severable region from the remainder of the canopy may be any system incorporating a means for rapidly producing shock energy. Such means for producing shock energy include energy-producing (i.e., "energetic") media such as, for example, explosive media. Such explosive media include linear explosive charges, one or more lengths of which may be disposed adjacent to or imbedded within the transparent portion of the canopy. In those situations in which one or more explosive charges are employed as the energetic medium, one or more such charges may be disposed in proximity to the interior surface of the canopy in a pattern that defines at least a portion of the perimeter of the severable region.

Examples of types of explosive charges that may be used in the canopy fracturing system of the invention include linear shape charges such as flexible linear shape charges (FLSC) and mild detonating cord (MDC). When using explosive charges (such as, for example, FLSC and MDC) to provide the force required to fracture the canopy and free the severable region, such explosive charges may be maintained in proximity to the inner surface of the canopy by a charge holder that is adhered or otherwise coupled to the inner surface of the transparent portion of the canopy and holds the one or more charges in a position that will on detonation effectively sever the severable region.

The severable region of the system of the present invention may have any shape that will inhibit passage of the region, once severed, back through the resulting opening in the canopy upon slight aftward movement of the severed region. Such shapes include those wherein the perimeter of the severable region will overlay (i.e., extend beyond) the perimeter of the opening created in the canopy once the severable region is freed from the unsevered remainder of the canopy and has moved aftward relative to the unsevered portion of the canopy. Such shapes include, for example, those wherein the forward portion of the severable region defines one or more lobes or other regions that extend laterally outward beyond the perimeter of the aft portion of the severable region. It will be understood that once a severable region having one or more such lobes or other extended regions is severed from the canopy and moves aftward, the one or more lobes or other extensions overlay and extend beyond the perimeter of the opening fractured in the canopy and obstruct the severed region from passing back through the opening. In one possible embodiment of the present invention's canopy fracturing system, the severable region may be generally saddle-shaped so as to include two opposed rounded lobes projecting from each lateral perimeter of the forward portion of the severable region.

The present aircraft canopy fracturing system optionally may be designed so that the severable region is forcefully propelled aftward once severed from the remainder of the canopy. Thus, the feature of the invention providing for a severable region of a novel and advantageous shape inhibiting implosion may be coupled with a means for supplying a desired directional impulse to the severable region once severed. As an example, the present system may provide for the forceful propulsion of the severed region by a particular arrangement of one or more explosive charges. In such an embodiment of the present system, the one or more explosive charges may provide the force to fracture the canopy and free the severable region while also imparting a forceful aftward propulsion to the severable region as it is freed from the remainder of the canopy. When utilizing explosive charges to impart aftward motion to the freed severable region, such charges may be disposed on the interior surface of the canopy and delimit at least a portion of the perimeter of the severable region. Examples of useful explosive charges include FLSC and MDC.

When FLSC and MDC charges are used to sever the severable region of the canopy, the charges preferably are held in proximity to the interior surface of the canopy by a charge holder that is adhered or otherwise joined to the canopy. The charge holder may be configured and/or positioned to result in the forceful aftward propulsion of the severable region once freed from the remainder of the canopy. One arrangement for holding the charge holder to the surface of the canopy is to utilize one or more beads of adhesive disposed in contact with both the charge holder and the canopy. The one or more adhesive beads may be configured and/or positioned so that detonation of the one or more explosive charges will forcefully propel the severable region aftward once freed from the remainder of the canopy.

The canopy of the present aircraft canopy fracturing system may be designed so as to be seated proximal to a sill portion of the aircraft and the system may include, in addition to the above-described arrangement for freeing a severable region of the canopy, one or more explosive charge positioned on or in close proximity to at least a portion of the sill and that will, on detonation, free substantially the entire transparent portion of the canopy from the aircraft. The present system also may be designed so as to selectively initiate either the detonation of the explosive charges mounted on or near the sill so as to sever substantially the entire transparent portion of the canopy or the fracturing of the smaller, severable region of the canopy. Detonation of the explosive charges mounted on or near the sill may be preferred over fracturing the severable region of the canopy in situations where the aircraft is on the ground or is otherwise not in flight and immediate egress from the cockpit is necessary.

The present system may also be designed so that the one or more explosive charges mounted on or near the sill detonate and free a large portion of the canopy from the aircraft simultaneous with the fracturing of the smaller, severable region to allow egress from the aircraft. Alternately, the present system may provide for the detonation of the one or more explosive charges mounted on or near the sill at a time subsequent to the fracturing and severance of the smaller, severable region.

The canopy fracturing system of the present invention provides the advantage of allowing full elimination of that portion of the canopy in the egress path of the ejecting pilot or other occupant, but without the necessity for an air bag, the attendant air bag actuating hardware, and the structural modifications necessary to mount and support the air bag and actuating hardware. The lack of a need for an air bag in the present canopy fracturing system reduces system cost, complexity, weight (with a resultant reduced long term aircraft fuel cost), and impairment of the cockpit occupant's vision relative to systems employing an air bag. The present system provides each of those relative advantages, while it also should increase system reliability.

The present canopy fracturing system is particularly useful in environments wherein the aerodynamically produced pressure field tends to spoil and reverse the flyaway of portions of the canopy severed by linear detonating charges or other severing means. As noted above, the present invention utilizes a uniquely designed severable region that will inhibit implosion of the severed region of the canopy in the direction of the cockpit occupant, even in the exceptionally adverse pressure fields associated with high speed aircraft, by allowing the severed section to slide aftward and away from the opening created when the severed section is freed from the remainder of the canopy. The fracture pattern of the present system creates a shape that cannot fall back into the resulting opening once shifted aftward, and aerodynamic forces, optionally assisted by explosive charges or some other arrangement for imparting an aftward propulsion to the severed canopy region, accelerates the severed region aftward and out of the ejecting occupant's egress path.

The present invention also is directed to an aircraft including a canopy fracturing system of the above-described design.

The present application also discloses an aircraft canopy fracturing system wherein the inner surface of the transparent portion of the canopy (which is preferably composed of a non-fragilizing material such as, for example, stretched acrylic or polycarbonate) includes thereon one or more lengths of a linear shape charge/charge holder assembly (or some other energetic fracturing means of a suitable construction) that generally defines a diamond-shaped pattern. The diamond-shaped pattern preferably is composed of two triangular-shaped portions meeting at their bases. The fracturing of the transparent canopy portion along the diamond-shaped fracture pattern would liberate a generally diamond-shaped region, while the fracturing of the canopy along the diamond-shaped pattern composed of the twin triangular regions would liberate two generally triangular-shaped portions from the canopy. In both such cases, the fracturing of the canopy and the liberation of the severed canopy portions would thereby define a generally diamond-shaped opening through the canopy. Preferably, the diamond-shaped opening is dimensioned to allow substantially the entire body of the egressing occupant to pass therethrough without impacting the unfractured remainder of the canopy. The system also may include means for imparting an aftward impulse to any freed portions of the canopy. Examples of such means are described herein.

Accordingly, the present invention provides for an improved system for fracturing the canopy of an aircraft and for otherwise allowing occupant egress from the cockpit of an aircraft. The reader will appreciate the foregoing details, objects, and advantages of the present invention, as well as others, upon consideration of the following detailed description of embodiments of the invention. The reader also may comprehend such additional details, objects and advantages of the present invention upon practicing the invention.

BRIEF DESCRIPTION OF THE DRAWINGS

The features and advantages of the present invention may be better understood by reference to the accompanying drawings in which:

FIG. 13 depicts a feature of an embodiment of the present invention and is a representation of a shroud or baffle arrangement for imparting a desired directional impulse to a canopy region severed by the present canopy fracturing system using a linear shape charge;

FIG. 14 depicts a feature of an embodiment of the present invention and is a representation in cross-section of a sill-routed mild detonating cord/charge holder assembly arrangement;

FIG. 15 depicts a feature of an embodiment of the present invention and is a representation in cross-section of a sill-routed FLSC/charge holder assembly arrangement;

DETAILED DESCRIPTION OF THE INVENTION

Figure 1:
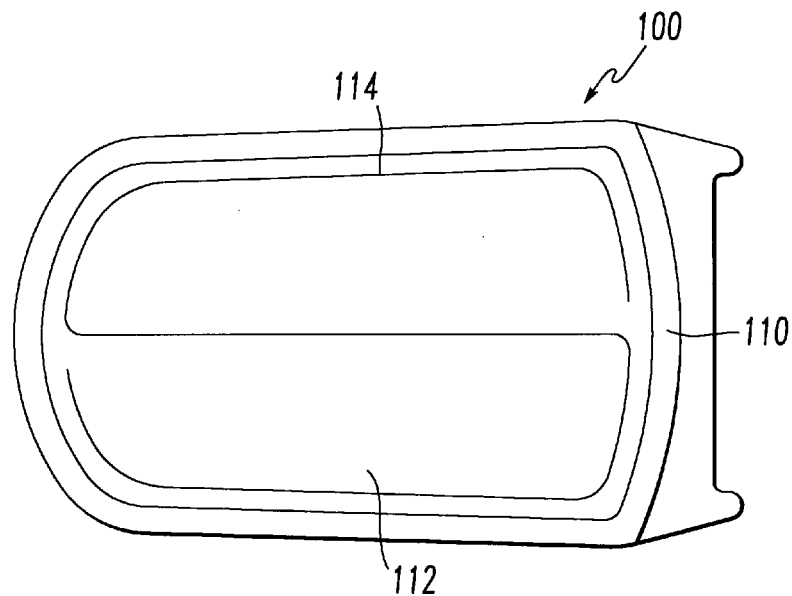
FIG. 1 is a representation, taken from above, of certain features of the canopy of a prior art aircraft canopy fracturing system utilizing an S-shaped fracture pattern.
Figure 2:
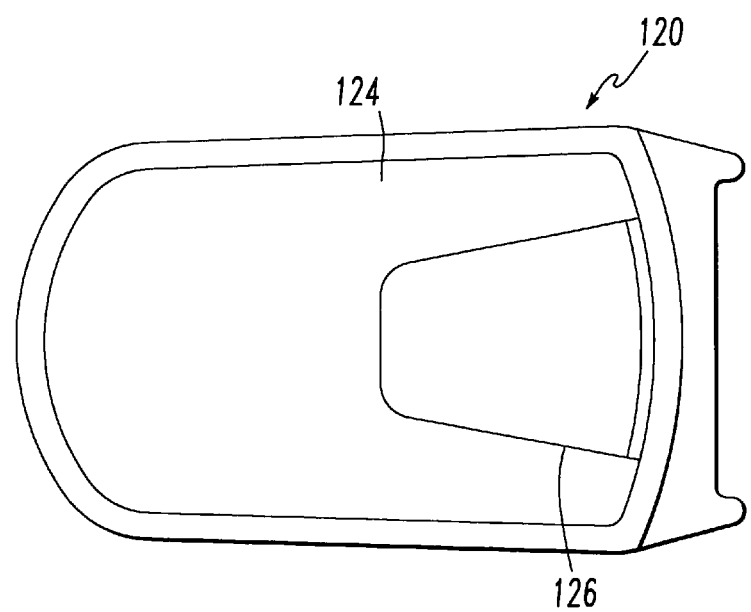
FIG. 2 is a representation, taken from above, of certain features of the canopy of a prior art aircraft canopy fracturing system utilizing a D-shaped fracture pattern.
Figure 3:
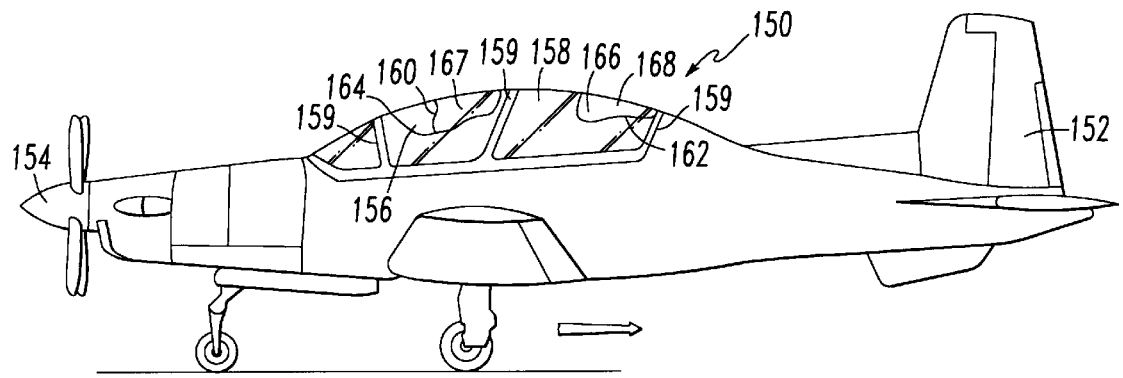
FIG. 3 is a side view representation of a dual canopy aircraft having a canopy fracturing system within the scope of the present invention and which has been installed on both canopies.
Figure 4:
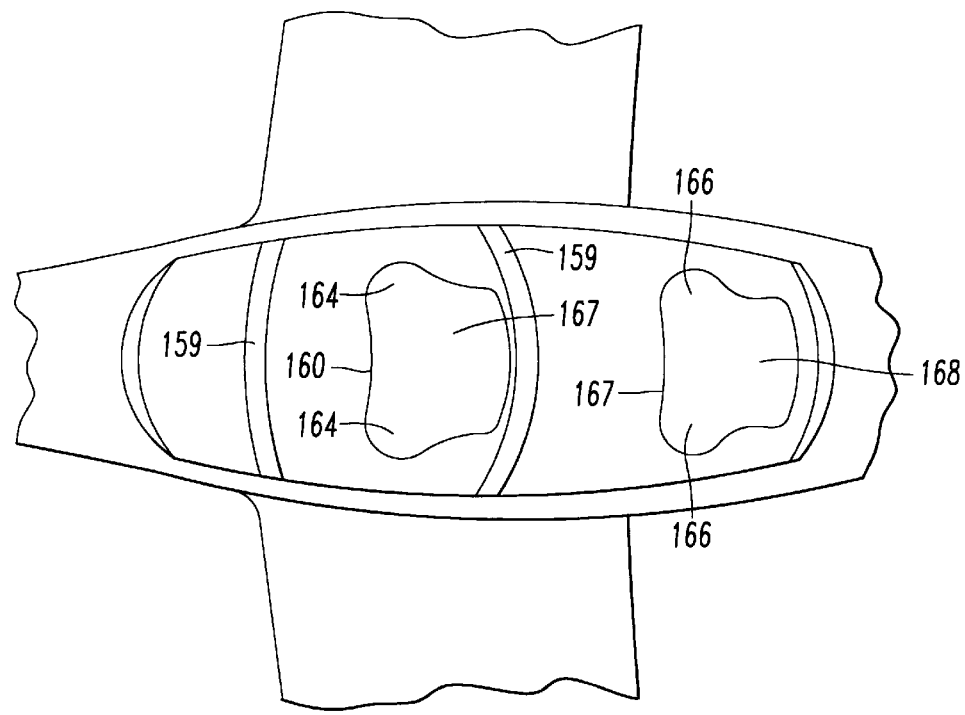
FIG. 4 is top view representation of the cockpit portion of the dual canopy aircraft shown in FIG. 3.

Referring now to the drawings for the purposes of illustrating embodiments of the present invention only, and not for purposes of limiting the same, FIG. 3 depict an aircraft 150, having tail section 152 and nose section 154, and including fore canopy 156, aft canopy 158, and canopy structural frame members 159. The canopies 156 and 158 preferably are comprised of a non-fragilizing transparent material. Canopies 156 and 158 include on their inner surfaces linear detonating cords 160 and 162, respectively, disposed in a generally saddle-shaped pattern having lobe-shaped portions 164 and 166 extending laterally from the forward portion of the severable regions 167 and 168 defined by the detonating cords. The aftward direction is generally indicated in FIG. 3 by the arrow beneath the figure. Once detonated, linear detonating cords 160 and 162 fracture canopies 156 and 158 along the saddle-shaped fracture patterns and free severable regions 167 and 168, respectively, which have generally the shape delineated by the detonating cord prior to detonation. Once freed, the severed canopy portions will be accelerated aftward by aerodynamic forces and will slide aft over the non-severed canopy sections to clear an egress path for the occupants of the aircraft cockpit. As shown in FIG. 4, the severable regions 167 and 168 may be sized so that substantially the entire body of an egressing occupant may pass through the opening left by removal of regions 167 or 168 without contacting any non-severed canopy sections.

Although FIG. 3 depicts a dual canopy aircraft having a canopy fracturing system of the present invention installed on both canopies, it will be understood that the present system may be installed on single canopy and multiple canopy aircraft alike, and that in the latter application, the present system may be installed on one or more of the several canopies.

FIG. 4 provides a top view of the cockpit portion of the aircraft depicted in FIG. 3 and shows that the linear detonating cords 160 and 162 each define a set of opposed lateral lobe-shaped extensions 164 and 166, respectively, located on the forward portions of the severable regions 167 and 168 defined by the detonating cords.

Figure 5:
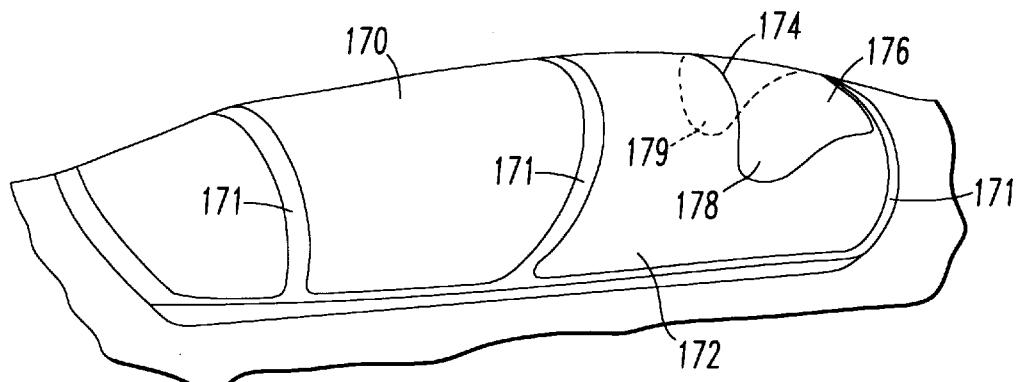
FIG. 5 is a right side perspective view of the canopy portion of a dual canopy aircraft incorporating the canopy fracturing system of the invention on the aft canopy and at a time prior to detonation of the linear detonating cord delineating the canopy's severable region.
Figure 6:
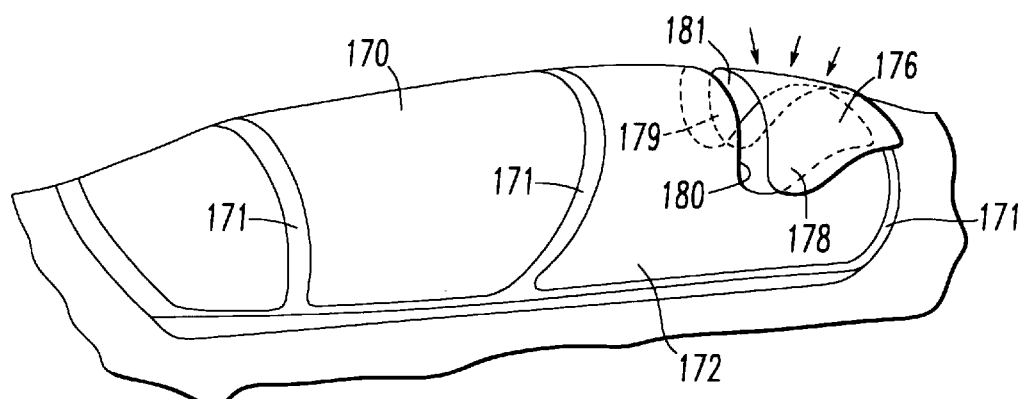
FIG. 6 is a right side perspective view of the canopy portion of FIG. 5 at a time just after severance of the severable region of the aft canopy.
Figure 7:
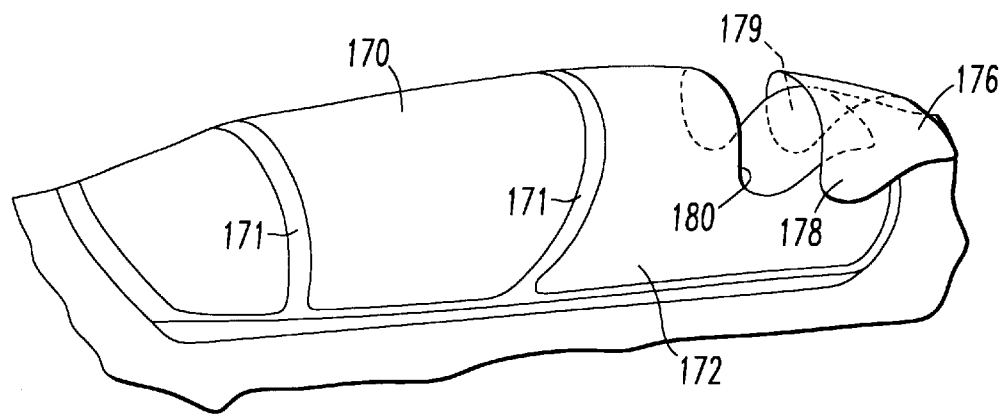
FIG. 7 is a right side perspective view of the canopy portion of FIG. 5 at a time just after that shown in FIG. 6.

The unique canopy fracture pattern of the present system defines a shape that, once freed as a severed region from the remainder of the canopy and shifted aftward relative to the remainder of the canopy, cannot pass through the opening fractured in the canopy because the forward portion of the severed region to some extent overlays the perimeter of the opening This feature of the invention will be better understood by reference to FIGS. 5–7. FIG. 5 depicts the canopy portion 170 of a dual canopy aircraft having fore canopy 170, canopy structural frame members 171, and aft canopy 172. Aft canopy includes detonating cord 174 defining a saddle-shaped fracture pattern within the scope of the present invention. The saddle-shaped pattern delineates a severable region 176 of the canopy that generally includes forward and aftward portions. For reference, the aftward direction in FIG. 5 is indicated by an arrow below the figure. The forward portion of severable region 176 includes the lobe-shaped extension 178 and 179 on each lateral side thereof.

FIG. 6 depicts the dual canopy shown in FIG. 5, but at a time subsequent to that shown in FIG. 5 and just after the severable region 176 has been freed from the unsevered remainder of the aft canopy 172 by detonation of detonating cord 174. Once completed, detonation of detonating cord 174 creates opening 181 bounded by opening perimeter 180. The circumstances depicted in FIG. 6 may occur approximately 2 milliseconds after the initiation of detonation of the linear detonating cord 174 shown in FIG. 5 in certain aircraft. The three truncated arrows indicate generally the aerodynamic pressure field acting on the severable region 176 in negative pressure situations. FIG. 6 shows that the severable region 176 has been lifted upward slightly from the remainder of the canopy and the aerodynamic and/or other forces acting on the severable region 176 have shifted it aftward relative to the unsevered portion of the aft canopy 172. It will be seen that once the severable region has shifted aftward, lobes 178 and 179 overlay the perimeter 180 of opening 181 and, consequently, severable region 178 is obstructed from passing through opening 181 and into the aircraft cockpit.

A time subsequent to that depicted in FIG. 6 is illustrated in FIG. 7. The time depicted in FIG. 7 may be approximately 8 milliseconds after initiation of detonation of the linear detonating cord 174 of FIG. 5 in certain aircraft. Severable region 176 has passed further aftward along the unsevered remainder of aft canopy 172 and, because of the shape of severable region 176, the lobes 178 and 179 continue to overlay the perimeter 180 defining opening 181 to thereby inhibit implosion of the severable region through the canopy opening 181 and into the cockpit.

Figure 16:
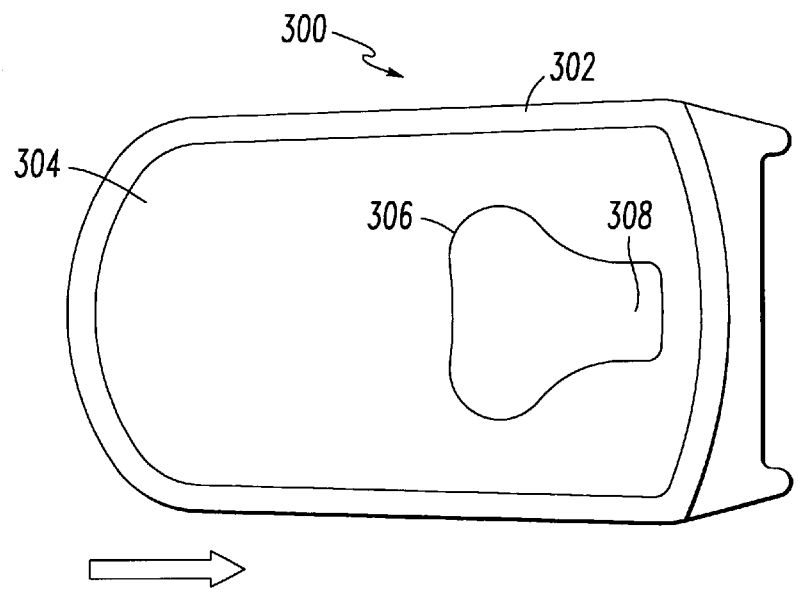
FIG. 16 is a representation of a top view of an aircraft canopy incorporating a canopy fracturing system of the present invention.

Although FIGS. 3–7 depict severable regions of a design that includes laterally extending lobe-shaped regions in the forward portion of the severable region (so-called "saddle-shaped" designs), it will be understood that the canopy fracturing system of the present invention may incorporate, and it encompasses the use of, any fracture pattern delineating a severable region having a shape that will not pass back through or implode into the opening fractured in the canopy once the severable region has been freed from the canopy and has shifted aftward. Such designs include those wherein an egress path may be provided through which at least substantially the entire egressing occupant may pass without impacting the unsevered remainder of the canopy. Such shapes include those having a forward portion that will to some extent overlay the perimeter of the opening fractured in the canopy once the freed severable region has shifted aftward. In particular, examples of such shapes include, for example, a dilated keyhole pattern such as is depicted in FIGS. 4 and 16, which permits pilot egress without knee and/or seat impact with the unsevered region of the transparent portion of the canopy. Once apprised of the foregoing principle of operation of the present invention, other novel severable region shapes inhibiting implosion into the cockpit will be apparent to those having ordinary skill, and all such shapes are features that fall within the scope of the present invention.

Any suitable method of fracturing a portion of an aircraft canopy to allow occupant egress may be used in the system of the present invention. Common to each such method is the use of an energetic medium that may be caused to rapidly supply a high shock to the transparent portion of the canopy sufficient to sever the canopy material. Examples of linear detonating cord that may be used in the present system to fracture the canopy include flexible linear shaped charge (FSLC) and mild detonating cord (MDC), both of which comprise a metal sheath (typically tin, lead, aluminum, silver, or copper) and an explosive core (typically HNS (hexanitrostilbene), CH6 (hexagen plus binders), or HMX (octagen)). When detonation of the FLSC or MDC is initiated, typically from the flyer plate output from a detonating donor SMDC tip or detonator. The detonating output from the linear cord will sever a non-fragilizing canopy material, which may be, for example, stretched acrylic or polycarbonate. The canopy is severed along the contiguous path of the linear cord and clears the desired egress pathway. Initiation of the linear cord by the detonating source may be arranged to cause bi-directional propagation of the detonation at a speed typically in excess of 6000 meters per second, which results in completion of the detonation event in a typical canopy, using any of the fracture patterns of the present invention, typically in about one millisecond or less. The detonation event causes an impulse to be applied to the severable region of the canopy, causing its initial movement outward from the unsevered canopy sections.

Figure 8:
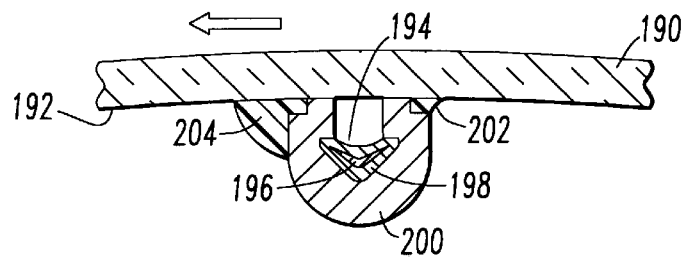
FIG. 8 depicts a feature of an embodiment of the present invention and is a representation of a cross-section through a flexible linear shape charge/charge holder assembly adhered to the inner surface of an aircraft canopy.

FSLC causes cutting of the canopy material via the formation of a high energy plasma jet from confluence of the output from the twin legs of the linear charge. (Alternatively, when operating in a hydraulic severance mode, the FLSC acts to transmit and focus shock energy to the target material.) The FLSC is typically contained within an elastomeric charge holder (as may be used with other linear shaped charges), and the charge holder is directly bonded to the inner surface of the canopy to delimit the desired fracture pattern. The charge holder physically protects the shaped charge and provides a proper standoff from the canopy surface. FIG. 8 is a representation of a cross-section through a FLSC in position on a canopy 190 having inner surface 192. FLSC 194 includes explosive core 196 and sheath 198 and is typically retained at a suitable standoff distance from surface 192 by charge holder 200 adhered to surface 192 by adhesive beads 202 and 204. However, it will be understood that other arrangements of the FLSC, inner canopy surface, and charge holder may be used in the present invention. For example, in hydraulic severance the region between the legs of the FLSC and the inner surface of the transparent portion of the canopy is occupied by a hydrodynamic medium such as an RTV adhesive. In another variation, the FLSC may be positioned directly against the inner surface and without a standoff.

MDC causes cutting of the canopy material via direct transmission of the shock output from the detonation. As shown in the cross-sectional representation of FIG. 9, MDC 210 is held against inner surface 212 of canopy 211 by charge holder 214 adhered to surface 212 by adhesive beads 216 and 217. MDC 210 comprises explosive core 218 and sheath 219. Unlike the typical applications of FLSC, MDC commonly is held in intimate contact with the canopy surface, and severance is effected via the immediate transmission of detonating energy from the MDC.

When using linear shaped charges (LSC) as the means to sever the canopy, retainers fabricated from, for example, approximately 0.12 inch thick fiberglass or aluminum, may be provided to cover the LSC/charge holder. The retainers provide for physical protection of the LSC/charge holder assemblies as well as for sustainment of backblast pressure against the inside of the severed sections to add outward impulse to the sections and aid in flyaway. Sizing of the retainers may be selected to provide a desired trajectory to the severed and freed sections. Although an impulse will be imparted to the severed region using FLSC, MDC, other linear shaped charges, or energetic media without a retainer, it is believed that use of a retainer will significantly increase the level of the applied impulse.

Although the use of FLSC and MDC are specifically referenced herein as means to fracture the canopy, the system of the present invention may employ any other arrangement that will quickly sever and free a predetermined region of the canopy in a manner suitable for emergency egress of an occupant. Such other arrangements include those that will provide a positionable source of focused high shock or severance- or separation-inducing energy (which may include deflagrating linear medium). Thus, any suitable energetic medium that may be caused to rapidly supply shock energy to the transparent portion of the canopy may be used, and those having ordinary skill in the canopy fracture art will understand that, for example, other known energetic media, including other known explosive media, may be incorporated effectively as a component of the present invention as the source of transparency severance.

Figure 9:
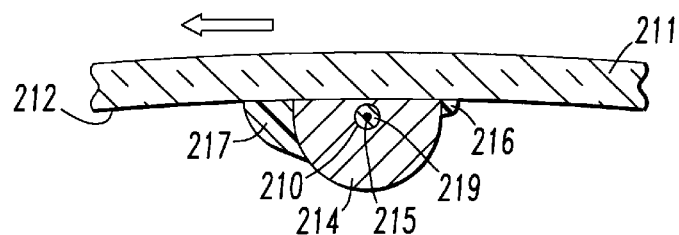
FIG. 9 depicts a feature of an embodiment of the present invention and is a representation of a cross-section through a mild detonating charge/charge holder assembly adhered to the inner surface of an aircraft canopy.

In any such arrangement for fracturing the canopy, it is preferred that the severing event also impart a directional impulse to the severed canopy region that will direct the severed region upward and aftward from the unsevered canopy regions. Accordingly, the canopy fracturing system of the present invention optionally may include one or more means to impart a desired trajectory to the severed region of the canopy. For example, the present system may incorporate a means to provide some aft impulse to the severed section of the canopy wherein the impulse is achieved by differentially harnessing the output of the explosive charge or other energetic severing source used to fracture the canopy. One such arrangement is to utilize a greater amount of adhesive to adhere aft sides of the charge holder to the canopy than is used on the forward sides of the charge holder. Two such arrangements are shown in FIGS. 8 and 9, in which the aftward direction is indicated by a solid arrow. The adhesive beads 204 and 207 on the aftward side of charge holders 200 and 214, respectively, are larger than the adhesive beads 202 and 216 located on the charge holders' forward sides, and this difference imparts an aftward impulse force to the severed canopy region providing a flyaway vector that reduces the tendency for implosion of the severed region.

Other possible approaches for imparting an aftward impulse to the severed canopy region include (1) providing an asymmetrical charge holder leg width, (2) providing a step in the transparent canopy material, (3) adding a deflector of some type to the acrylic (such as an "L"-shaped bracket), and (4) externally routing the blast pressure field via baffling or shrouding around the charge holder. These possible approaches are described in detail below.

Figure 10:
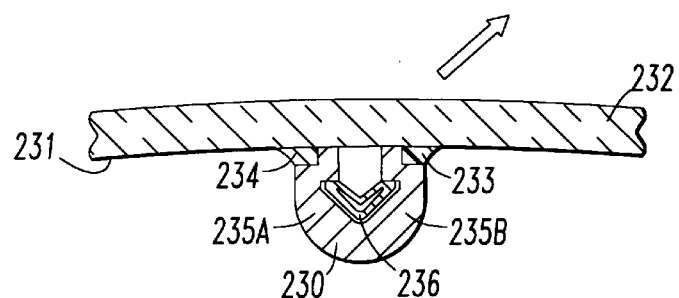
FIG. 10 depicts a feature of an embodiment of the present invention and is a representation of a cross-section through a flexible linear shape charge/charge holder assembly adhered to the inner surface of a canopy and wherein the charge holder has an asymmetric leg width.

In providing an asymmetrical charge holder leg width, the mass of material on one side of the charge holder is greater relative to the mass of the charge holder's other leg. Greater mass may be provided by, for example, increasing the density and/or width of one leg of the charge holder. FIG. 10 depicts one such asymmetrical charge holder arrangement wherein asymmetrical charge holder 230 is adhered to inner surface 231 of canopy 232 by adhesive beads 233 and 234. Leg 235A of charge holder 230 is wider in cross-section than leg 235B. As the densities of legs 235A and 235B do not significantly differ, the mass of leg 235A is greater than that of leg 235B. On detonation of FLSC 236, the mass difference of legs 235A and 235B results in an impulse in the general direction of the arrow in FIG. 10 being imparted to the severed section of canopy 232.

Figure 11:
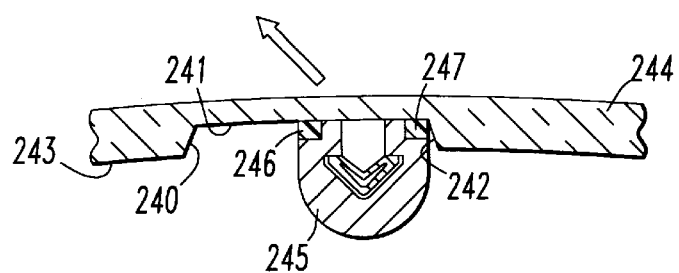
FIG. 11 depicts a feature of an embodiment of the present invention and is a representation of a cross-section through an FLSC/charge holder assembly adhered to an inner surface of a canopy and wherein the assembly is mounted in a step or channel defined by the canopy's inner surface.

A canopy fracture system arrangement of the present invention wherein the transparent canopy material includes a step so as to create an aftward impulse is generally depicted in FIG. 11, wherein a step or channel defined by surfaces 240, 241, and 242 is provided on the inner surface 243 of canopy 244. FLSC/charge holder assembly 245 is secured within and to one side of the channel by adhesive beads 246 and 247. The positioning of FLSC/charge holder assembly 245 adjacent surface 242 provides the severed canopy section with an impulse in the general direction of the arrow in FIG. 11 on detonation. One or more lengths of channel with FLSC/charge holder mounted therein may be suitably provided in positions on the canopy's inner surface so as to provide for the desired aftward impulse on detonation of the charge.

Figure 12:
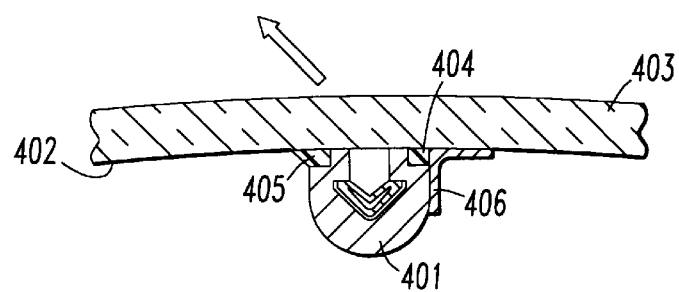
FIG. 12 depicts a feature of an embodiment of the present invention and is a representation of a cross-section through an FLSC/charge holder assembly adhered to a canopy wherein a bracket having an "L"-shaped cross-section is mounted on a side of the charge holder and abuts the junction of the charge holder and the canopy's inner surface.

FIG. 12 depicts a third possible arrangement for imparting a desired directional impulse to the severed canopy region. FLSC/charge holder assembly 401 is adhered to the inner surface 402 of transparent canopy portion 403 by adhesive beads 404 and 405. Bracket 406, which may have an "L"-shaped or other suitably shaped cross-section, is disposed to one side of assembly 401 and abuts the junction of the assembly 401 and canopy 403. Bracket 406 acts to deflect the explosive force of the FLSC detonation and thereby may be positioned to impart an impulse to the severed canopy section generally in the direction of the arrow vector shown in FIG. 12.

FIG. 13 depicts in a general form a fourth possible arrangement for imparting a desired directional impulse to the severed canopy region. FLSC/charge holder assembly 450 is secured to the inner surface 451 of transparent canopy portion 452. FIG. 13 schematically depicts the arrangement of the foregoing elements as viewed from the side of the cockpit, and pilot 452 is shown for reference. Also, the aft direction is indicated by the horizontal arrow. FLSC/charge holder assembly 450 is surrounded by a shroud or baffle 455, which is constructed and positioned so that it directs the explosive force generated by the detonation of the FLSC to impart an aftward impulse to the severed region of the canopy.

The present canopy fracturing system optionally may also include means for separating all or a substantial portion of the canopy from the aircraft by severing the periphery of the canopy in the vicinity of the sill to which the canopy is mounted. As an example, the present system may include a sill-routed linear explosive line that may be detonated to separate the canopy substantially around its entire periphery in the vicinity of the sill. Such full peripheral separation of the canopy may be desirable during, for example, ground or low speed egress. Two possible arrangements of the sill-routed linear explosive line are generally depicted in FIGS. 14 and 15. FIG. 14 generally depicts a cross-section through the region where transparent canopy portion is coupled to sill portion 251. MDC/charge holder assembly 252 is retained adjacent inner surface 253 of transparent canopy portion 250 by hook-shaped retainer 254 that is joined to sill portion 251 by fastener 255. It will be appreciated that retainer 254 and MDC/charge holder assembly 252 may be disposed around substantially the entire periphery of the transparent portion of the canopy near its abutment with the sill.

A similar sill-routed fracture system arrangement is depicted generally in FIG. 15, wherein FLSC/charge holder assembly is joined to the inner surface 260 of transparent canopy portion 261 by adhesive beads 262 and 263 and is retained in position by hook-shaped retainer 264 adjacent sill portion 265 by fastener, which also couples the sill portion 265 and transparent portion 261. Such an arrangement also may be routed around substantially the entire periphery of the transparent canopy portion near its junction with the sill portion.

The system of the present invention also may be designed so that during ground egress there is no delay between the fracture, by explosive charge or otherwise, of the sill-routed canopy fracturing means and the means for fracturing and freeing a relatively smaller portion of the canopy positioned over the occupant.

It is contemplated that the ability to fully peripherally separate the canopy near the sill also may be useful in in-flight egress situations. For example, the system of the invention may be designed so that there is a time delay between the severance of the two canopy sections: the severable region above the occupant may be severed and freed first to permit the occupant to emerge, and the canopy may then be severed and freed a t or near it full periphery at or in the vicinity of the sill prior to impact of the emerging occupant's knees with the unsevered portion of the canopy.

Figure 17:
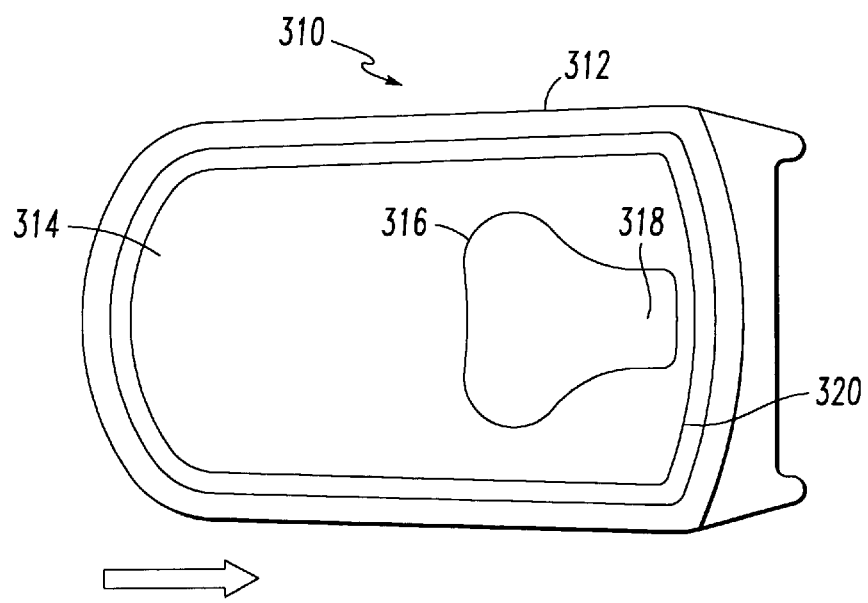
FIG. 17 is a representation of a top view of an aircraft canopy incorporating a canopy fracturing system of the present invention.

With the above-described optional sill routing in mind, FIGS. 16 and 17 depict possible alternate routings of linear shape charges within the scope of the present invention. In both of FIGS. 16 and 17, the aft direction is indicated by a solid arrow. FIG. 16 depicts a top view of canopy 300 having structural frame 302 and transparent portion 304. Linear shape charge/charge holder assembly 306 is disposed in the above-described saddle-shaped pattern to define a severable region 308 having a reduced tendency to implode into the aircraft cockpit in negative pressure environments as is described in detail above. FIG. 17 depicts an alternate design for a canopy fracturing system encompassed by the present invention and wherein canopy 310 includes structural frame 312, transparent portion 314, and linear shape charge/charge holder assembly 316 in a saddle-shaped pattern defining severable region 318. In contrast to FIG. 16, canopy 310 of FIG. 17 also includes linear shape charge/charge holder assembly 320 routed around the periphery of the canopy 310 near the junction of transparent portion 314 and structural frame 312. Detonation of assembly 320 will fracture transparent portion 314 and sever canopy 310 from the aircraft around the canopy's entire periphery near the sill in which the canopy is mounted.

Regardless of the exact design of the canopy fracturing system of the present invention, the behavior of the severed region of the canopy upon completion of the detonation (or upon action of any other severing means employed) is an interactive result of the complex aerodynamic and dynamic kinetics of the severed region and its surroundings. It is believed that prior to the present invention the only successful system approach to full canopy removal via severance providing some measure of protection from imploded canopy sections is the Saab Scania system described generally above. Timing of the function of the airbag system in the Saab Scania system is such that it (1) assists in flyaway of the severed S-cut clamshell sections through impact with the air bag and also through increased cockpit pressure, (2) physically covers and thereby protects the cockpit occupant from the severed sections as they break apart and, decelerated by the windstream, sweep backwards over the occupant, and (3) deflates to permit occupant egress without interference. The present invention utilizes the basic aerodynamics of the canopy environment to realize results similar to the Saab Scania system, but without the attendant cost, complexity, and weight.

In the present invention, when using an energetic medium such as a linear shaped charge to fracture the canopy the medium also will provide an outwardly directed impulse applied to the severed region, which will cause the severed region to move outwardly away from the unsevered canopy section, and the special shape of the severed region contemplated by the present invention will inhibit implosion of the severed section. The present invention also improves upon the existing systems by optionally including any of a number of different mechanisms to aid in the absorption of an aftward impulse by the severed region and to assist in the development of the region's aftward velocity. It is believed that in the case of negative pressure environments, in which the airfoil tends to drive the severed canopy sections back into the egressing occupant, the aftward velocity of the severed region developed by its resistance to the windstream and augmented by any application of additional aftward impulse, will cause aftward movement of the severed region relative to the unsevered portions of the canopy so that by the time aerodynamic forces can overcome and reverse the outward motion of the severed region, it will have moved aftward a sufficient extent to prevent its implosion into the canopy due to its unique shape. Further, the severed region's aftward velocity, coupled with continued aftward wind forces, will overcome any friction developed between the severed and unsevered canopy sections and will cause the severed region to slide back aftwards over the unsevered regions, thereby fully opening an egress path for the occupant.

In the case of neutral or positive pressure environments, wherein the severed section is accelerated away from the occupant by the aerodynamic field, the system of the present invention will augment the natural flyaway behavior of the severed region so as to fully clear an egress path, but without adding to system complexity, cost, or weight. As described above, the present invention may be used in a canopy severance system that also provides for full peripheral cutting of the transparent portion of the canopy from the canopy frame, but the basic in-flight egress path is safely provided by the non-implodable nature of the present design.

The present invention may be used in any cockpit using a canopy fracturing system, and the unique shape of the severed region contemplated by the invention may be used for both in-flight as well as ground egress modes without additional peripheral or other explosive line routings to satisfy all egress requirements. A hinge between the aft sections of the canopy saddle and the sill also may be provided and in certain circumstances will be beneficial to the function of the invention, in particular if the linkage permits or causes some aftward motion to enable the pattern shift that will prevent implosion of the severed section. The hinge may be, for example, a simple strap connecting the non-severed section with the severed section of the canopy, or may be a spring-loaded metal joint that augments the flyaway of the severed section. Once apprised of this feature of the invention, other arrangements providing like advantages will be readily apparent to those of ordinary skill in the canopy design arts.

Figure 18:
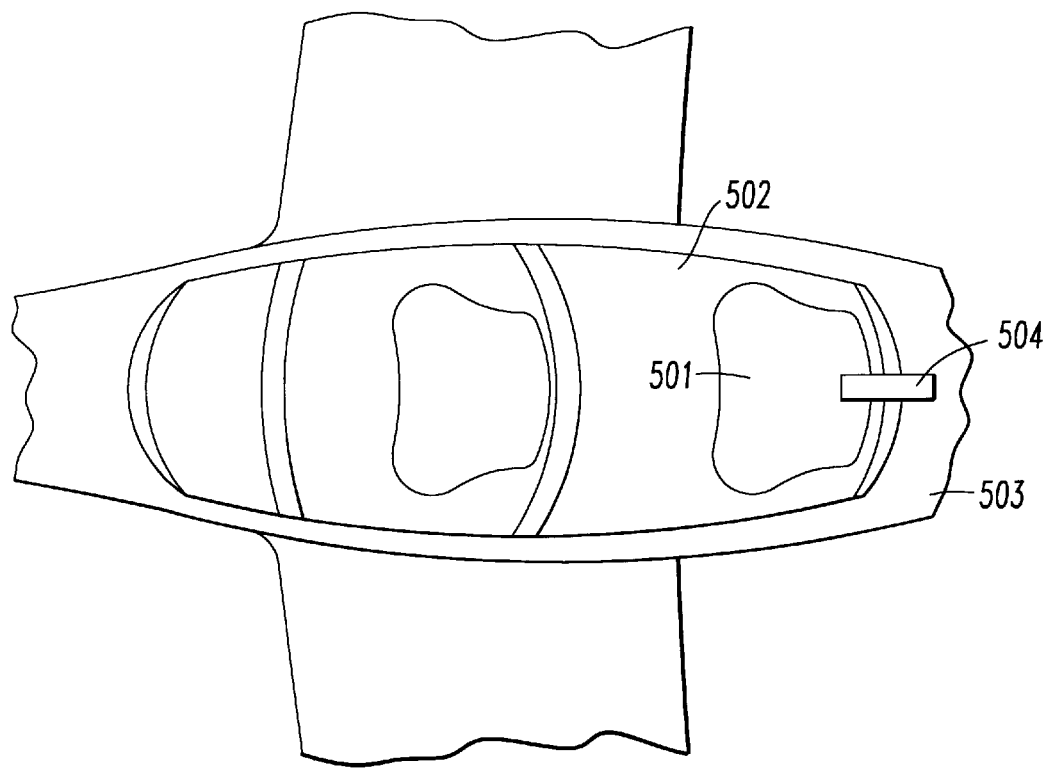
FIG. 18 is a representation of a top view of an aircraft canopy fracturing system of the present invention wherein a resilient strap connects the severable region of the aft canopy to the fuselage of the aircraft.

FIG. 18 depicts a representation of a top view of a dual canopy aircraft including one such hinge arrangement of the invention wherein severable region 501 of aft canopy 502 is coupled to fuselage 503 by pretensioned resilient strap 504. Strap 504 facilitates aftward motion of severable region 501 and inhibits its implosion once detonation of the aircraft's canopy fracturing system has occurred.

Figure 19:
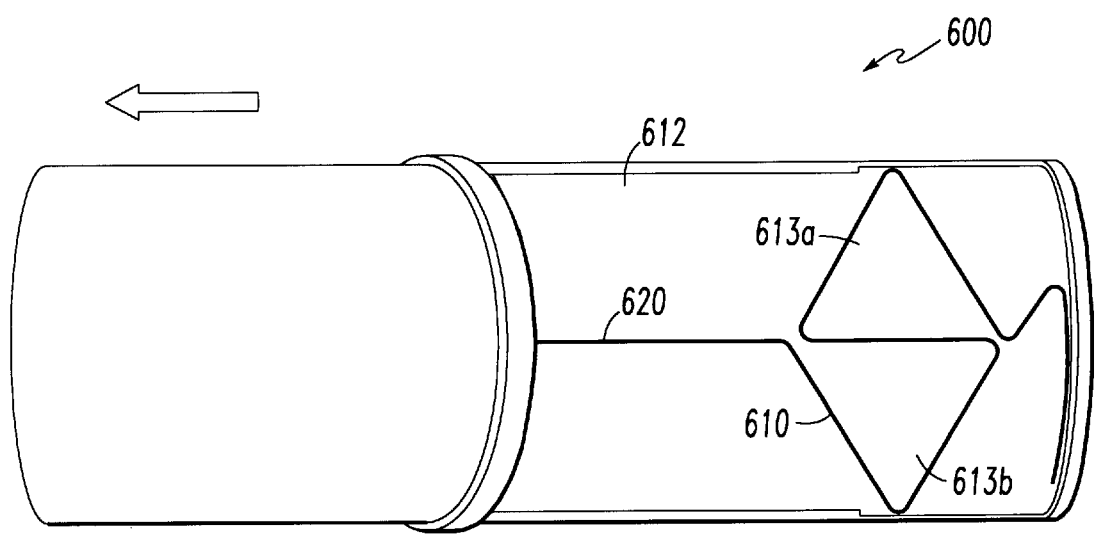
FIG. 19 is a representation of a canopy fracturing system invention that is described herein.
Figure 20:
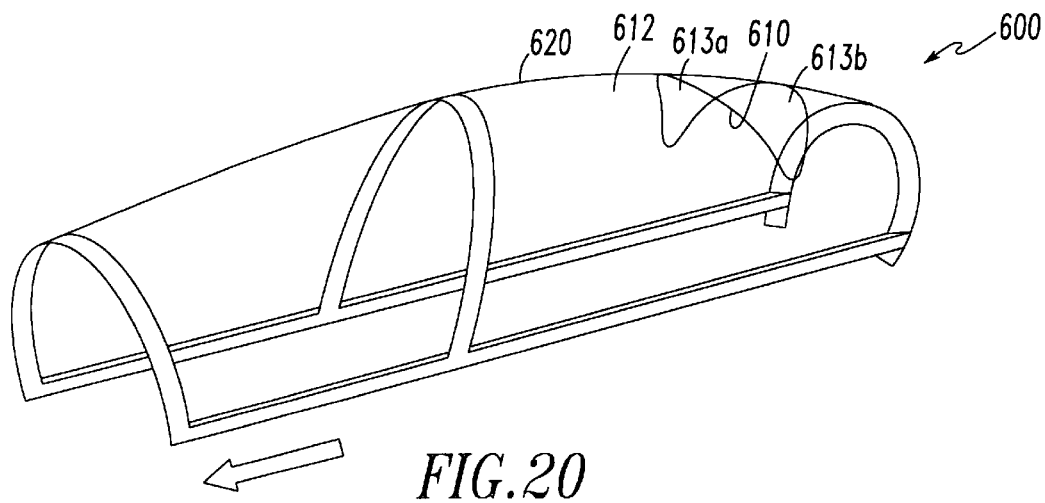
Figure 21:
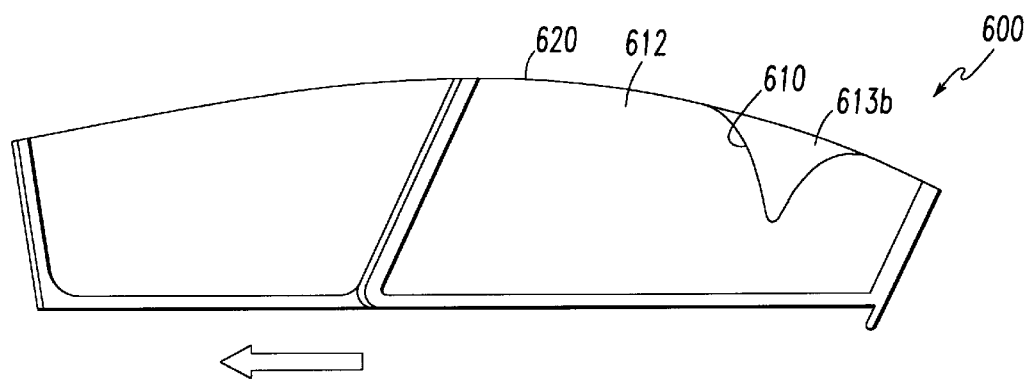
Figure 22:
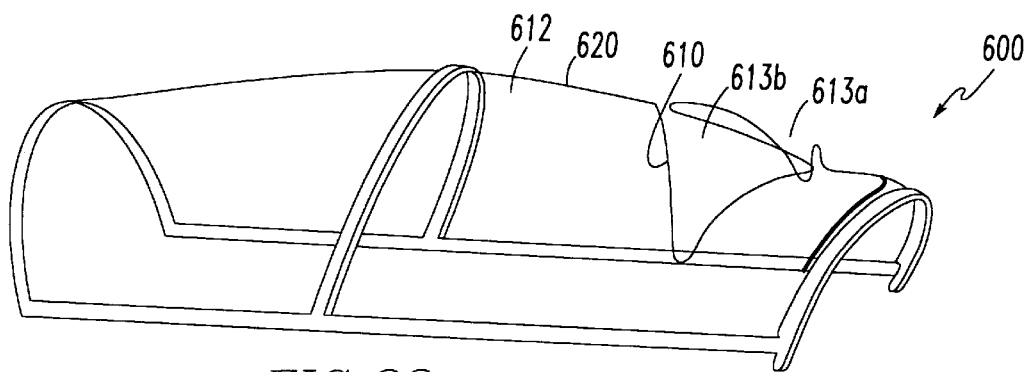
Figure 23:
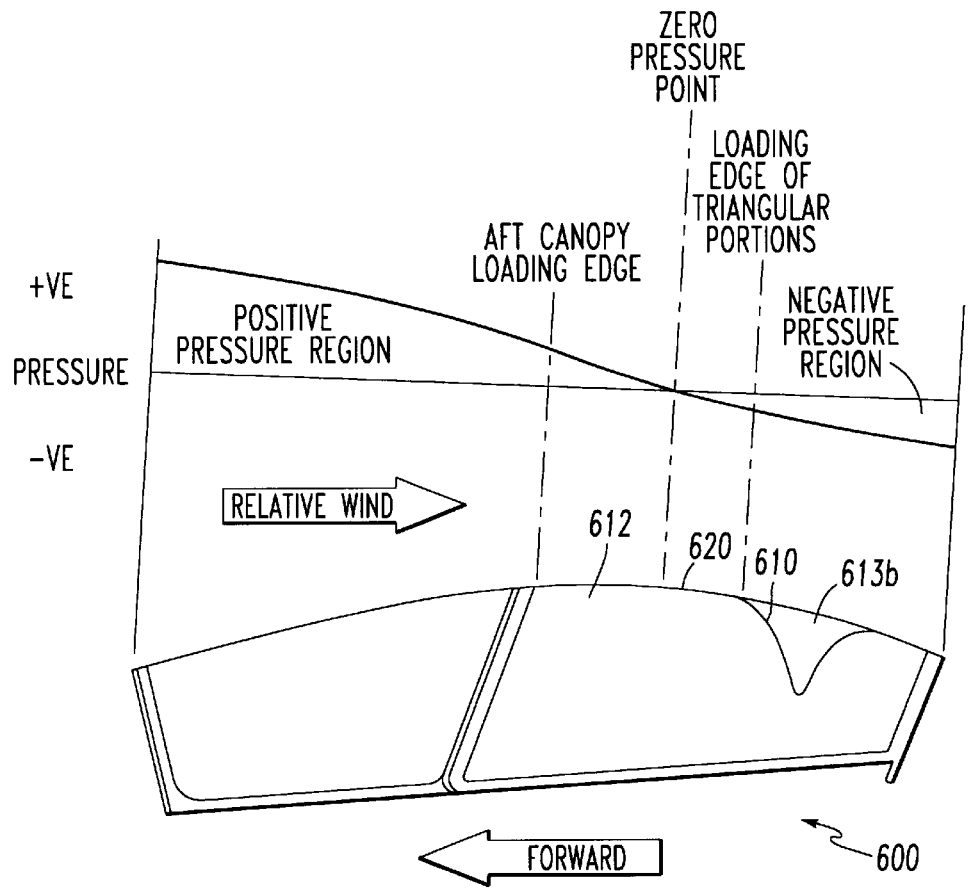
Figure 24:
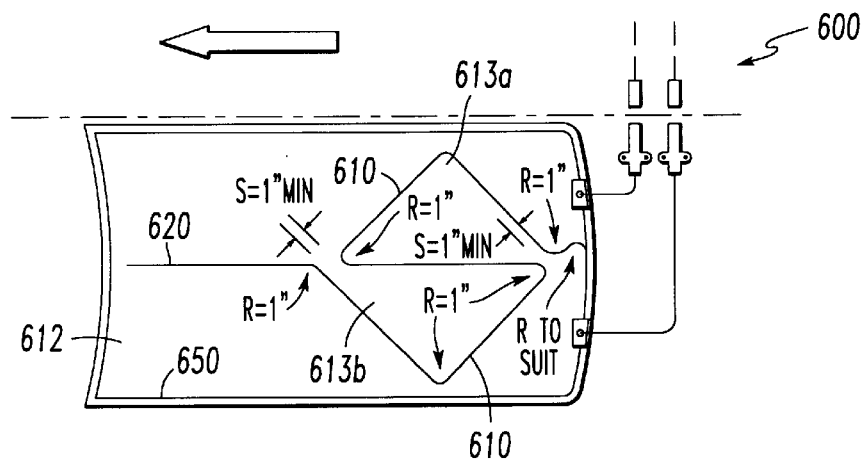
Figure 25:
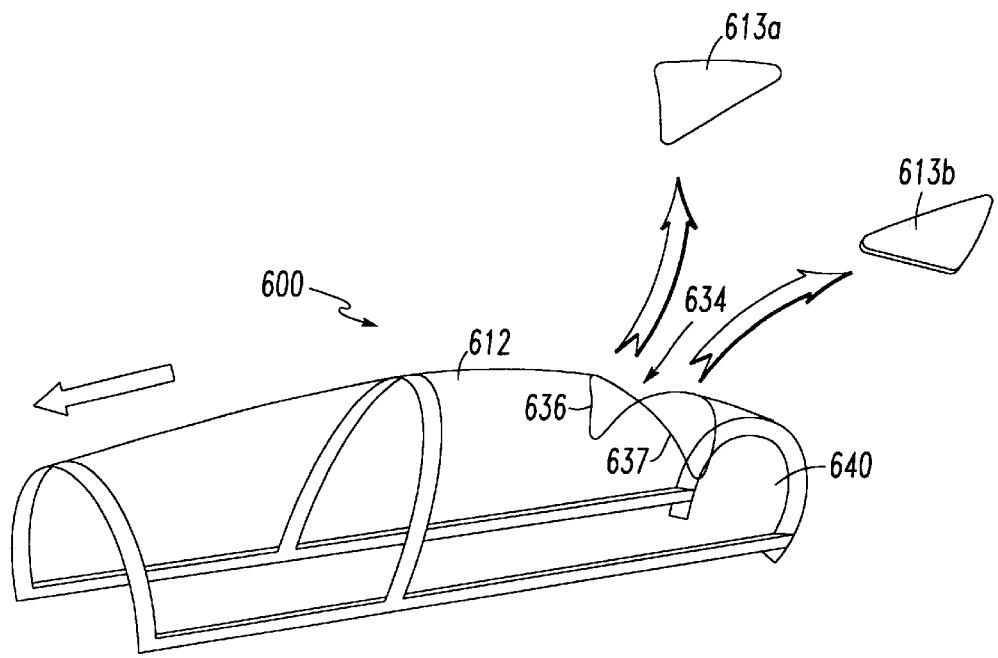
Figure 26:
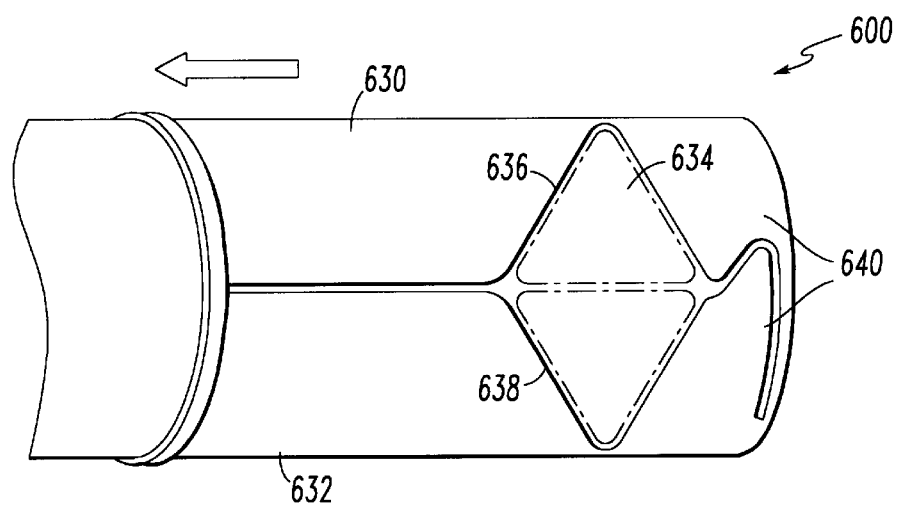
Figure 27:
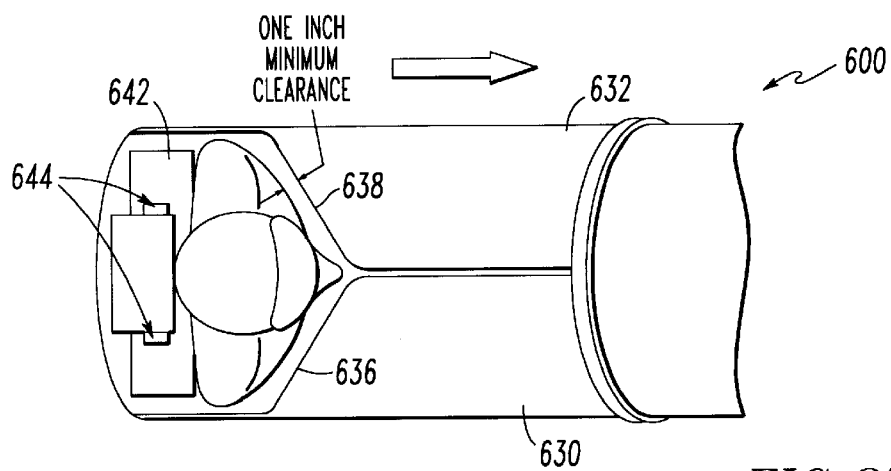
Figure 28:
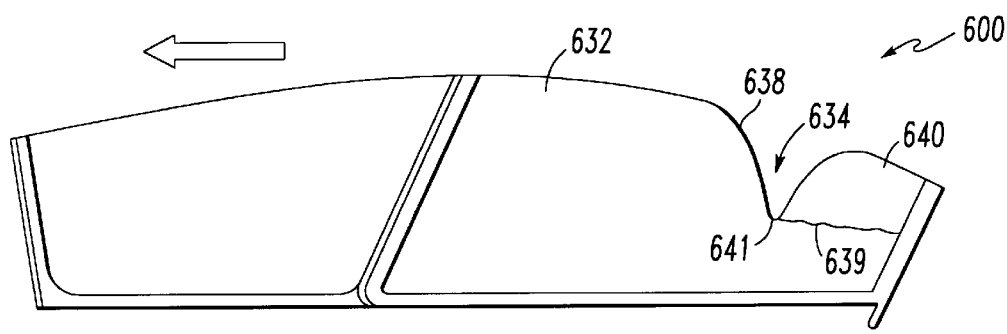
Figure 29:
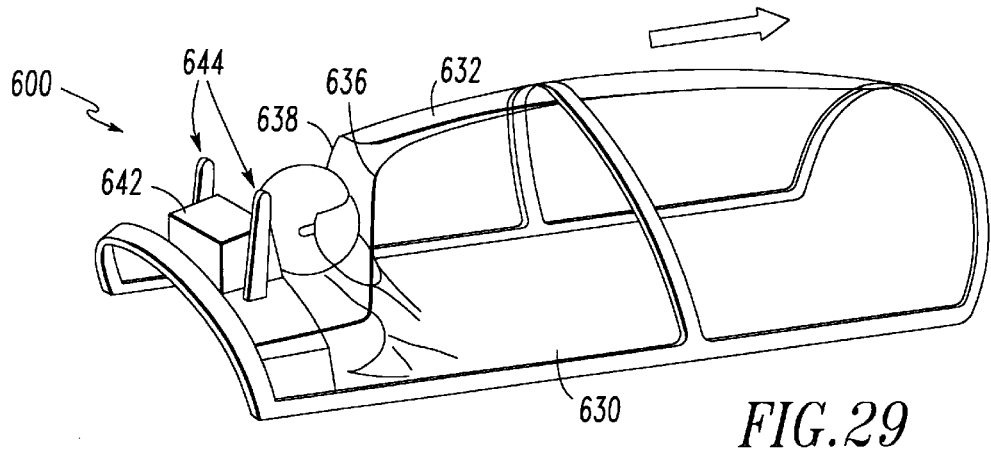
Figure 30:
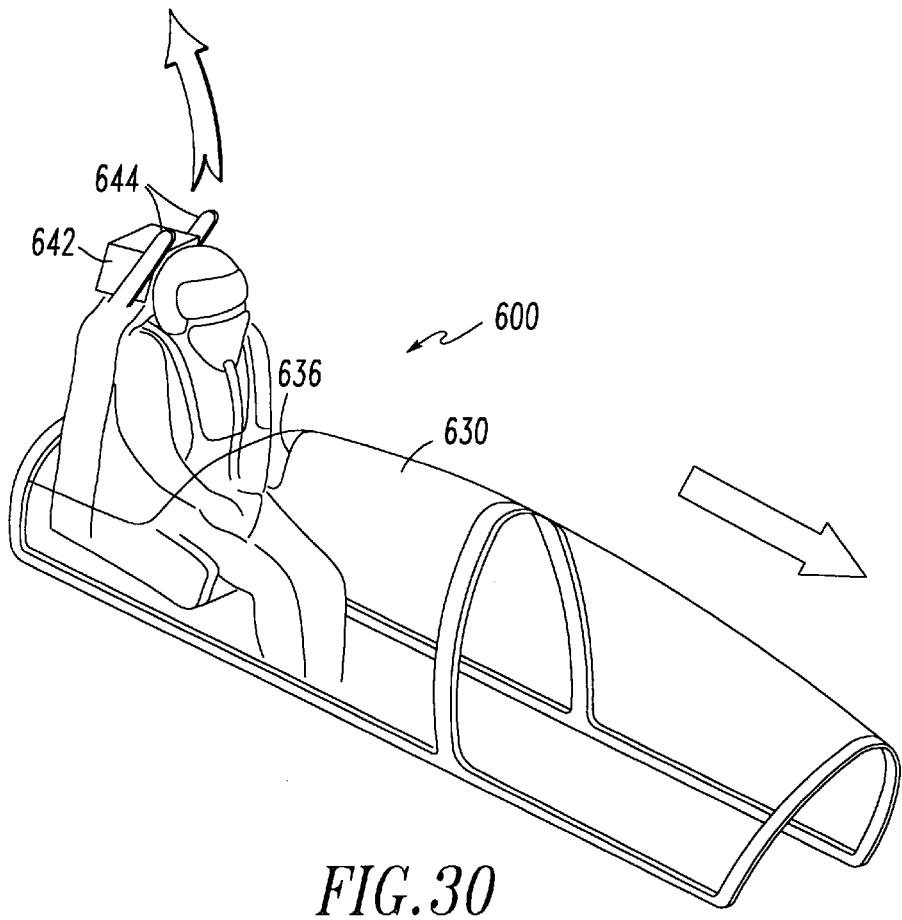
Figure 31:
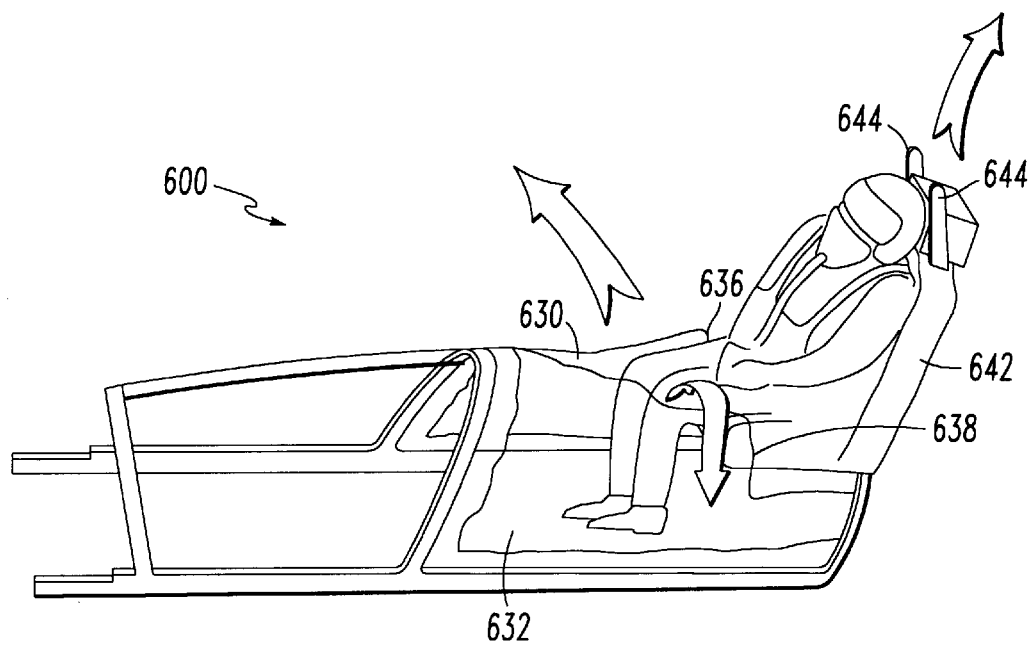

The present application also is directed to the invention of an aircraft canopy fracturing system having a general construction that encompasses the embodiment 600 depicted in FIG. 19. In FIG. 19, the downward-directed arrow indicates the forward direction on the aircraft to which the system 600 is attached. As schematically depicted in FIG. 19, system 600 includes a routing of a linear shape charge/charge holder assembly 610 that is installed on the inner surface of transparent canopy portion 612 to define a fracture pattern that includes two opposed triangular portions 613a and 613b. Preferably, the transparent canopy portion is constructed of a non-fragilizing material such as, for example, stretched acrylic or polycarbonate. On detonation of the linear shape charge within linear shape charge/charge holder assembly 610, the two triangular portions 613a and 613b will be freed from the remainder of the canopy and will leave a diamond-shaped opening within the transparent canopy portion 612 through which the aircraft occupant may egress. Preferably, the diamond-shaped opening fractured in the canopy by detonation of the linear shape charge is dimensioned so that substantially the entire occupant may eject through such opening without contacting the intact remainder of the transparent portion.

Although the embodiment of FIG. 19 has been described as including a linear shape charge to provide the energy to fracture the transparent portion 612, it will be understood that any other source of fracturing energy may be incorporated into the system 600 of FIG. 19. Examples of other energetic means that may be used to fracture the transparent canopy material in system 600 are discussed above in connection with the other invention described in the present disclosure.

The system generally represented by the embodiment 600 of FIG. 19 optionally may include a linear shape charge/ charge holder assembly or other energetic fracturing means that is sill-routed or is disposed on the inner surface of the transparent canopy portion 612 in the vicinity of the sill. Such an energetic means is represented as the linear shape charge/charge holder assembly 614 in FIG. 19. Such a linear shape charge/charge holder assembly 614 may be detonated or otherwise activated to fracture the transparent canopy portion 612 around its periphery in the vicinity of the sill. Freeing the canopy at that location would typically allow for egress of aircraft occupants when the aircraft is on the ground or is moving relatively slowly. The system generally represented by the embodiment 600 of FIG. 19 optionally also may include a length of linear shape charge or other energetic means, such as means 620, that is located on the inner surface of the transparent canopy portion 612 forward of the diamond-shaped region described by triangular portions 613a and 613, is disposed generally in the fore-aft direction, and is positioned at or near the center of the transparent portion 612, as is shown generally in FIG. 19. Possible energetic means include those discussed above, and the preferred general arrangement of such energetic means is as depicted in FIG. 19. Detonation or initiation of the energetic means 620 would sever the transparent canopy portion 612 at or in the vicinity of the location of the energetic means and would allow the canopy halves defined by the severance pattern to be pushed apart if impacted by the occupant and/or by his or her ejection seat as the occupant ejects from the aircraft. The risks posed to the egressing occupant by such an impact would be substantially reduced because of the severance of the canopy along the line defined by energetic means 620. The canopy fracturing system generally disclosed in FIG. 19 also may include means to impart an aftward impulse to any portions of the canopy material freed by detonation or other activation of the energetic fracturing means. Examples of means for imparting the aftward impulse include those arrangements described above (and that are schematically depicted in FIGS. 8–13).

Various other details of the design and implementation of aircraft canopy fracturing systems will be apparent to those of ordinary skill in the canopy fracturing system arts and, therefore, need not be provided herein in order to allow those persons to make and use the present invention. Such design details are in part provided in, for example, "A Systems Engineering Design Guide to Aircraft Explosive Canopy Fracturing", December 1993, Teledyne Ryan Aeronautical, McCormick Selph Ordinance, the entire content of which is hereby incorporated herein by reference.

Those of ordinary skill in the art also will appreciate that various changes in the details, materials, and arrangement of parts which have been herein described and illustrated in order to explain the nature of the invention may be made by those skilled in the art, and all such modifications will remain within the principle and scope of the invention as expressed in the appended claims.

What is claimed is:

1. An aircraft canopy fracturing system for creating an opening in the canopy for occupant egress, the system including a canopy comprising a transparent material and having a severable region severable from said canopy to provide said opening, said severable region having a perimeter defining at least one laterally disposed projection of said transparent material, said severable region having a shape that inhibits passage of said severable region through said opening once said severable region is severed from said canopy and displaced aftward relative to said opening, said opening sized to allow unimpeded passage of substantially the entire occupant through said canopy.

2. The aircraft canopy fracturing system recited in claim 1 wherein the said transparent material is a non-fragilizing transparent material.

3. The aircraft canopy fracturing system recited in claim 1 wherein said severable region comprises fore and aft portions and wherein said fore portion of said severable region is shaped so as to at least partially overlay the perimeter of said opening in said canopy when said severable region is severed from said canopy and displaced aftward relative to said opening, said overlaying arrangement obstructing passage of said severable region through said opening.

4. The aircraft canopy fracturing system recited in claim 3 wherein said fore portion of said severable region has a perimeter that defines at least one laterally disposed projection that extends beyond a perimeter of said aft portion of said severable region, said projection at least partially overlaying said perimeter of said opening in said canopy when said severable region is severed from said canopy and displaced aftward relative to said opening.

5. The aircraft canopy fracturing system recited in claim 4 wherein said perimeter of said fore portion of said severable region defines at least two lobe-shaped laterally disposed extensions extending beyond said aft portion's perimeter, said severable region being generally saddle-shaped, at least a portion of each said extension overlaying said perimeter of said opening in said canopy when said severable region is severed from said canopy and displaced aftward relative to said opening.

6. The aircraft canopy fracturing system recited in claim 1 further comprising an energetic medium, detonation or excitement of said energetic medium fracturing said canopy to thereby sever said severable region from said canopy.

7. The aircraft canopy fracturing system recited in claim 6 wherein said energetic medium is at least one explosive charge.

8. The aircraft canopy fracturing system recited in claim 6 wherein said medium is disposed in proximity to a surface of said canopy and delimits at least a portion of the perimeter of said severable region.

9. The aircraft canopy fracturing system recited in claim 7 wherein said at least one explosive charge is disposed on a surface of said canopy and delimits at least a portion of said severable region's perimeter.

10. The aircraft canopy fracturing system recited in claim 9 wherein said at least one explosive charge is maintained in proximity to said canopy by a charge holder adhered to said canopy.

11. The aircraft canopy fracturing system recited in claim 10 wherein said at least one explosive charge is selected from one or more of flexible linear shape charges and mild detonating cords.

12. The aircraft canopy fracturing system recited in claim 1 wherein said severable region is forcefully propelled aftward once severed from said canopy.

13. The aircraft canopy fracturing system recited in claim 9 wherein said at least one explosive charge forcefully propels said severable region aftward once severed from said canopy.

14. The aircraft canopy fracturing system recited in claim 13 wherein said at least one explosive charge is disposed on a surface of said canopy and delimits at least a portion of said perimeter of said severable region.

15. The aircraft canopy fracturing system recited in claim 14 wherein said at least one explosive charge is selected from flexible linear shaped charges and mild detonating cord.

16. The aircraft canopy fracturing system recited in claim 14 wherein said explosive charge is held in proximity to said canopy by a charge holder adhered to said canopy.

17. The aircraft canopy fracturing system recited in claim 16 wherein said charge holder is configured and positioned relative to said surface of said canopy so at to forcefully propel said severable region aftward relative to said opening once said severable region is severed from said canopy.

18. The aircraft canopy fracturing system recited in claim 17 wherein at least one adhesive bead adheres said charge holder to said canopy and wherein said adhesive bead is configured and positioned so that detonation of said at least one explosive charge forcefully propels said severable region aftward relative to said opening once said severable region is severed from said canopy.

19. The aircraft canopy fracturing system recited in claim 1 wherein said canopy is comprised of a transparent material selected from stretched acrylic and polycarbonate.

20. The aircraft canopy fracturing system recited in claim 3 wherein said canopy is seated on a sill of said aircraft and wherein said system further comprises a sill-routed explosive charge, said sill-routed explosive charge disposed in proximity to at least a portion of said sill, detonation of said sill-routed explosive charge separating a section of said canopy that is larger than said severable region.

21. The aircraft canopy fracturing system recited in claim 20 wherein said sill-routed explosive charge and said at least one explosive charge delimiting at least a portion of said perimeter of said severable region detonate simultaneously to allow egress from said aircraft.

22. The aircraft canopy fracturing system recited in claim 20 wherein detonation of said sill-routed explosive charge occurs after detonation of said explosive charge delimiting at least a portion of said perimeter of said severable region.

23. The aircraft canopy fracturing system recited in claim 16 wherein said charge holder comprises two legs, one said leg having a mass that is greater than that of the remaining said leg.

24. The aircraft canopy fracturing system recited in claim 16 wherein said charge holder is positioned within a channel defined on said inner surface of said canopy.

25. The aircraft canopy fracturing system recited in claim 16 wherein a deflector is provided on said surface of said canopy adjacent the junction of said charge holder and said inner surface.

26. An aircraft canopy having fore and aft portions, said canopy comprising a transparent material and having a severable region capable of being severed from said canopy to provide an opening therethrough, said severable region having a perimeter defining at least one laterally disposed projection of said transparent material, said severable region having a shape that inhibits passage of said severable region through said opening once said severable region is severed from said canopy and is displaced aftward relative to said canopy, said opening sized to allow unimpeded passage of substantially the entire occupant through said canopy.

27. The aircraft canopy recited in claim 26 wherein the canopy is comprised of a non-fragilizing transparent material.

28. The aircraft canopy recited in claim 26 wherein said severable region comprises fore and aft portions and wherein said fore portion of said severable region is shaped so as to at least partially overlay the perimeter of said opening in said canopy when said severable region is severed from said canopy and displaced aftward relative to said canopy, said overlaying arrangement obstructing passage of said severable region through said opening.

29. The aircraft canopy recited in claim 28 wherein said fore portion of said severable region has a perimeter that defines at least one projection that extends beyond a perimeter of said aft portion of said severable region, said projection at least partially overlaying said perimeter of said opening in said canopy when said severable region is severed from said canopy and displaced aftward relative to said canopy.

30. The aircraft canopy recited in claim 29 wherein said perimeter of said fore portion of said severable region defines at least two lobe-shaped laterally disposed extensions extending beyond said aft portion's perimeter, said severable region being generally saddle-shaped, at least a portion of each said extension overlaying said perimeter of said opening in said canopy when said severable region is severed from said canopy and displaced aftward relative to said canopy.

31. The aircraft canopy recited in claim 26 further comprising an energetic medium, initiation of said energetic medium fracturing said canopy to thereby sever said severable region from said canopy and create said opening.

32. The aircraft canopy recited in claim 31 wherein said energetic medium is at least one explosive charge.

33. The aircraft canopy recited in claim 32 wherein said at least one explosive charge is disposed in proximity to a surface of said canopy and delimits at least a portion of the said severable region's perimeter.

34. An aircraft comprising a canopy having fore and aft portions, said canopy comprising a transparent material and having a severable region severable from said canopy to provide an opening therethrough, said severable region having a perimeter defining at least one laterally disposed projection of said transparent material, said severable region having a shape that inhibits passage of said severable region through said opening once said severable region is severed from said canopy and is displaced aftward relative to said canopy, said opening sized to allow unimpeded passage of substantially the entire occupant through said canopy.

35. The aircraft recited in claim 34 wherein said canopy comprises a non-fragilizing transparent material.

36. An aircraft canopy fracturing system for creating an opening in the canopy of an aircraft for occupant egress, the system comprising a canopy comprised of a non-fragilizing transparent material and having a severable region severable from said canopy to provide an opening, said severable region having a perimeter defining at least one laterally disposed projection of said transparent material, said severable region shaped to inhibit passage of said severable region through said opening when said severable region is severed from said canopy and displaced aftward relative to said opening.

37. An aircraft canopy having fore and aft portions, said canopy comprised of a non-fragilizing transparent material and having a severable region capable of being severed from said canopy to provide an opening therethrough, said severable region having a perimeter defining at least one laterally disposed projection of said transparent material, said severable region having a shape that inhibits passage of said severable region through said opening once said severable region is severed from said canopy and is displaced aftward relative to said canopy.

38. An aircraft comprising a canopy having fore and aft portions, said canopy comprised of a non-fragilizing transparent material having a severable region capable of being severed from said canopy to provide an opening therethrough, said severable region having a perimeter defining at least one laterally disposed projection of said transparent material, said severable region having a shape that inhibits passage of said severable region through said opening once said severable region is severed from said canopy and is displaced aftward relative to said canopy.

39. An aircraft canopy fracturing system for creating an opening in the canopy of an aircraft for occupant egress, the system comprising a canopy having a severable region severable from said canopy to provide said opening, said severable region comprising fore and aft portions, said fore portion of said severable region shaped so as to at least partially overlay the perimeter of said opening to thereby obstruct passage of said severable region through said opening when said severable region is severed from said canopy and displaced aftward relative to said opening, said opening sized to allow unimpeded passage of substantially the entire occupant through said canopy.

40. The aircraft canopy fracturing system recited in claim 39 wherein said fore portion of said severable region has a perimeter that defines at least one projection that extends beyond a perimeter of said aft portion of said severable region, said projection at least partially overlaying said perimeter of said opening when said severable region is severed from said canopy and displaced aftward relative to said opening.

41. The aircraft canopy fracturing system recited in claim 40 wherein said perimeter of said fore portion of said severable region defines at least two lobe-shaped laterally disposed extensions extending beyond the perimeter of said aft portion, said severable region being generally saddle-shaped, at least a portion of each said extension overlaying said perimeter of said opening in said canopy when said severable region is severed from said canopy and displaced aftward relative to said opening.

42. An aircraft canopy fracturing system for creating an opening in the canopy for occupant egress, the system comprising:

a canopy seated on a sill of the aircraft and having a severable region severable from said canopy to provide said opening, said severable region comprising fore and aft portions and wherein said fore portion is shaped so as to at least partially overlay the perimeter of said opening in said canopy when said severable region is severed and displaced aftward relative to said opening, the overlaying arrangement obstructing passage of said severable region through said opening; and a sill-routed explosive charge disposed in proximity to at least a portion of said sill, detonation of said sill-routed explosive charge separating a section of said canopy that is larger than said severable region.

43. An aircraft canopy fracturing system for creating an opening in the canopy for occupant egress, the system comprising:

a canopy having fore and aft portions and a severable region severable from said canopy to provide said opening, said severable region having a shape that inhibits passage of said severable region through said opening once said severable region is severed and displaced aftward relative to said opening, said opening sized to allow unimpeded passage of substantially the entire occupant through said canopy;

at least one explosive charge; and a charge holder holding said explosive charge in proximity to a surface of said canopy and delimiting at least a portion of the perimeter of said severable region said charge holder having two legs, one said leg having a mass that is greater than that of the remaining said leg, said at least one explosive charge forcefully propelling said severable region aftward once severed from said canopy.

44. An aircraft canopy fracturing system for creating an opening in the canopy for occupant egress, the system comprising:

a canopy having fore and aft portions and a severable region severable from said canopy to provide said opening, said severable region having a shape that inhibits passage of said severable region through said opening once said severable region is severed and displaced aftward relative to said opening, said opening sized to allow unimpeded passage of substantially the entire occupant through said canopy;

at least one explosive charge held in proximity to a surface of said canopy and delimiting at least a portion of the perimeter of said severable region, said at least one explosive charge forcefully propelling said severable region aftward once severed from said canopy; and a deflector provided on said surface adjacent a junction of said charge holder and said surface.

45. An aircraft canopy having fore and aft portions and a severable region severable from said canopy to provide an opening therethrough, said opening allowing unimpeded passage of substantially the entire occupant of the aircraft through said canopy, said fore portion shaped so as to at least partially overlay the perimeter of said opening when said severable region is severed from said canopy and displaced aftward relative to said canopy, said overlaying arrangement obstructing passage of said severable region through said opening.

* * * * *